INVENTOR
William E. DeLisle
BY Spencer E. Olson
ATTORNEY

Aug. 27, 1968 W. E. DE LISLE 3,399,350

SELF-TIMING DECODER FOR PULSE CODE WHEREIN CODE STRUCTURE IS SUBJECT TO RESTRAINTS

Filed May 18, 1964 4 Sheets-Sheet 2

INVENTOR
William E. DeLisle
BY Spencer E. Olson
ATTORNEY

Aug. 27, 1968 W. E. DE LISLE 3,399,350
SELF-TIMING DECODER FOR PULSE CODE WHEREIN CODE STRUCTURE
IS SUBJECT TO RESTRAINTS
Filed May 18, 1964 4 Sheets-Sheet 3

INVENTOR
William E. DeLisle
BY
Spencer E. Olson
ATTORNEY

INVENTOR
William E. DeLisle

BY Spencer E. Olson
ATTORNEY

United States Patent Office 3,399,350
Patented Aug. 27, 1968

3,399,350

SELF-TIMING DECODER FOR PULSE CODE WHEREIN CODE STRUCTURE IS SUBJECT TO RESTRAINTS

William E. De Lisle, Buffalo, N.Y., assignor to Sylvania Electric Products Inc., a corporation of Delaware
Filed May 18, 1964, Ser. No. 367,946
5 Claims. (Cl. 325—38)

ABSTRACT OF THE DISCLOSURE

A pulse code communication system including a transmitter for generating any one of a plurality of binary code words having specific structural restraints and a decoder adapted to be controlled in timing in response to the structure of received code words, to produce a unique output for each code upon reception of a single copy of the code, and to provide low power consumption during standby. The decoder comprises a magnetic core shift register, two differentiator-squaring amplifier time control circuits, a monostable responsive to each input pulse to control the driving and ONE loading of the shift register and to charge capacitors in the time control circuits, another monostable for controlling reset and readout of the shift register in response to an output signal from one of the time control circuits, the other time control circuit being used to effectively load ZEROS into the register, and a plurality of AND gate code detectors connected to the output terminals of the shift register. The monostables and time control circuits employ complementary transistors which are all in the "cut-off" state during standby.

This invention is concerned with pulse code communication systems and particularly with reliable communication of preset digital codes and a self-timing decoder useful for recognizing them.

Presently, a number of communications systems are available for transmitting and recognizing one or more preset codes. In one such class of code systems, a discrete tone is transmitted for each "code." This technique, however, is restricted to specialized types of communications systems in which precise tones can be generated, transmitted, received, and demodulated with fidelity.

The more conventional approach is to employ pulse coded or digital communication systems having either radio or closed circuit linkage wherein intelligence is transmitted and otherwise processed in the form of electric or electromagnetic impulses. For example, messages may be comprised by the presence or absence, or by variations in the amplitude, tone, frequency, etc., of synchronous signals representing the ONES and ZEROS of a binary code. The decoder in such a system typically comprises a shift register continuously driven by a free-running clock which is synchronized with timing information extracted from the received signal. Since the oscillator and shift register in this method are in continuous operation, the decoder continuously consumes power, even during standby periods. Also, in the event oscillator drift at the transmitter or receiver causes a frequency error to exist between the pulse rate actually transmitted and the decoder clock rate, the resultant time error in loading the continuously driven shift register will accumulate as each bit is added to the register. In addition, since the decoder extracts timing information from the received signal for synchronization purposes, a number of code transmissions are required for recognition, resulting in delay in the decoding response.

Accordingly, it is a general object of this invention to provide improved apparatus for recognizing pulse code transmissions.

It is a more particular object of the invention to provide a self-timing decoder, i.e., a decoder not requiring a clock oscillator, for recognizing any of M preset digital codes with very low power consumption during standby periods.

Another object is to provide a pulse code decoder in which time errors are not cumulative so as to permit some deviation in the bit rate of the transmitted code.

Another object is to provide a decoder capable of recognizing and producing a unique output for any of M preset codes upon reception of only a single copy of the code.

Briefly, the foregoing objects are attained by transmitting binary code words with specific limitations placed upon their structure, although they may be of any predetermined length. The maximum number of codes available (M) is dependent upon the total word length (N-bits) adopted for the system and may be easily determined therefrom. The decoder for recognizing any of the M preset codes comprises, a shift register, two monostable multivibrators, two specialized differentiator squaring amplifier circuits, and associated logic circuitry. Magnetic shift register elements are used, and all transistors are in the cut-off state when the decoder is at rest, thereby providing low power consumption during standby. Time errors are not cumulative since the loading of each ONE into the shift register is determined by a drive gated by each input information pulse. Although time errors can accumulate on ZEROS, this is minimized by the code structure. The decoder is self-timed by any of the M preset code structures, and, by means of AND gate detectors, provides a unique output for each code upon receipt of a single copy of the code.

Other objects, features, advantages and modifications of the invention, and a better understanding of its construction and operation will be apparent from the following description with reference to the accompanying drawings, wherein.

Figure 1:
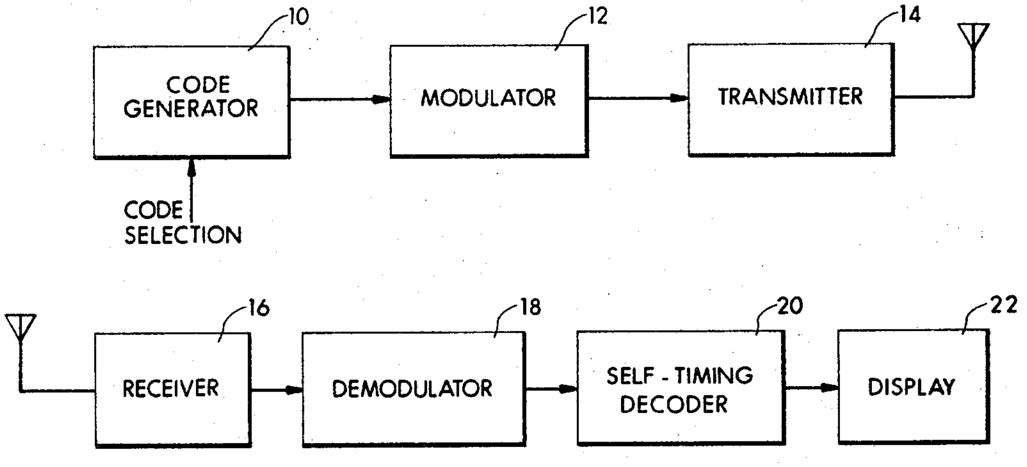
FIG. 1 is a block diagram of a code communication system embodying the invention.

The radio communication system shown in FIG. 1 comprises a transmitter including a code generator 10, having a code selection capability, a modulator 12 and a transmitter 14, and a receiving station including a receiver 16, a demodulator 18, a self-timing decoder 20, and a suitable display 22. Such a code communication system has a number of applications. For example, it may comprise a command and control system with the decoded signal being applied to start or stop some operation (not shown). Also, it may be used in a selective calling system with the selected code comprising an address, or call signal, and the receiving station representing one of a plurality of such stations having a display 22 indicating which of the stations is being called. The self-timing decoder 20, and the code structure employed, represent the principal features of the invention and provide a receiver which has low power consumption during standby and, therefore, is well suited for operation in remote locations for long unattended periods. Consequently, the construction and operation of the decoder and the code structure characteristics will be explained in full detail, whereas the other components of the system, being well known in various modifications to those skilled in the art of digital radio communication, will be described only to the extent necessary for an understanding of the operation of the invention.

*Code structure*

The capability of the present decoder to operate without a clock oscillator and, therefore, to be self-timing, for any one of M preset codes, is dependent on the structure of the code used for transmitting the intelligence. The binary code words, according to the invention, may be of any predetermined length, subject to the following restraints:

(1) The first bit of each word shall be a "1";
(2) The third from last bit of each word shall be a "1" and the last two bits of the word shall be "0's," i.e., the last three bits of each word shall be "100";
(3) Consecutive "0's" shall not occur except at the end of a word, as noted in (2).

These three restraints cover the general case in which the decoder is arranged to recognize both the ZEROS and ONES of the code word. The decoder may be simplified to recognize only the ONES, but, to avoid ambiguity, this special case requires the addition of a fourth restraint, namely, that each word contain the same number of ONES.

Because of the first two restraints, the first and the last three bits of any word can be essentially ignored in determining the number M of codes available for a total word length of N bits, and as will be seen, it is convenient to determine M as a function of N', where $N'=N-4$ bits. The number of combinations available for a given code length, keeping in mind restraint (3) above, may be determined by the Fibonacci sequence, $$M_n=M_{(n-1)}+M_{(n-2)}$$

where $M_n$ is the available number of combinations for a particular word length, which in the present case will be designated N'. To start determination of the number of combinations, $N'=1$ and $N'=2$ must be determined by trial and error, and thereafter it is possible to determine the combinations for $N'=3$ by the sequence $M_3=M_2+M_1$, as follows:

$$M_3=M_2+M_1=3+2=5$$
$$M_4=M_3+M_2=5+3=8$$
$$M_5=M_4+M_3=8+5=13$$
$$M_6=M_5+M_4=13+8=21$$

By continuing this process, it is possible to generate a table of the values of M (number of combinations) for different values of N'. Thus, for integral values of N' below 7, the following table can be set up:

| N' | M | N' | M |
|---|---|---|---|
| 6 | 21 | 3 | 5 |
| 5 | 13 | 2 | 3 |
| 4 | 8 | 1 | 2 |

The foregoing process of computing the values of M, after determining $M_1$ and $M_2$ by trial and error, can be determined for any value of N' greater than 6 from the following known approximation: $M\approx1.17(1.618)^{N'}$. It will be seen from the foregoing, then, when the four bits are added to N', that twenty-one codes are available for a word length of ten bits, thirteen for a word length of nine bits, and so on.

*Decoder*

The function of the self-timing decoder 20 (shown in detail in the block diagram of FIG. 2) is to recognize any of M preset binary codes having the aforementioned structural restraints, and to provide a unique output for each code, upon receipt of a single copy of that code, without the need for a clock source. This is accomplished by applying the demodulated pulse code from demodulator 18 to the trigger input terminal of an input monostable multivibrator 24. The output pulse from the triggered monostable is applied to a differentiating circuit 25, and the differentiated trailing edge is applied to shift register 26 to load a ONE into its first storage element. Shift register 26 has a length of $N-2$ elements, where N is the predetermined code word length as defined earlier, and is preferably of the magnetic core type, such as that described in "Digital Applications of Magnetic Devices," Meyerhoff et al., 1960 edition, John Wiley & Sons, Inc., pp. 237–240 and 480–483. The differentiated leading edge of the monostable output pulse is applied through an OR gate 28 to drive the shift register 26. The full output pulse from the monostable is also applied in parallel to a pair of differentiator circuits 31 and 33. Differentiators 31 and 33 are regeneratively coupled to squaring amplifiers 35 and 37 respectively. The output pulse from squaring amplifier 35 is applied to a differentiating circuit 27 and its differentiated trailing edge also applied through the OR gate 28 to trigger the shift register 26 driver, as will be explained later, causing a ZERO to be "loaded" into the shift register. The output pulse from squaring amplifier 37 is applied to a differentiating circuit 29 and its differentiated trailing edge is utilized to trigger a sample and clear monostable 30. The output pulse from the triggered monostable 30 is applied in parallel as a sample pulse to enable a plurality of AND gate code detectors $\mathbf{32}_1$ through $\mathbf{32}_M$ and to shift register 26 in which it serves as a clear pulse to reset all of the shift register elements to the ZERO state. In the case of a magnetic core register, this reset action causes a pulse to be generated at the output terminal of each element which contained a ONE just prior to the clear pulse. As a consequence, the magnetic register can be read out at the same time it is being cleared. The input terminals of the AND gate code detectors are connected to the shift register output terminals by well known methods, and the output of each of the code detectors $\mathbf{32}_1$–$\mathbf{32}_M$ is applied to a suitable display means 22.

Each of the code detectors 32 is an AND gate operative to produce an output corresponding to the received code word in response to a combination of magnetic core shift register outputs corresponding to the word occurring in time coincidence with a "clear" pulse to the register and a "sample" pulse to the detectors. Only one of the detectors produces an output for a corresponding one of the M possible code words.

The decoder is designed so as to consume very little power except when pulses are being received. As will be described in detail hereinafter, the monostable multivibrators, squaring amplifiers, and differentiators employ complementary transistors in such a way that all transistors are in the "cut-off" state when the decoder is at rest. Magnetic shift register elements which consume no power except when they are being driven, are utilized. Further, if, as is typically the case, register 26 includes a driver for shaping the shift pulses applied to its elements, a blocking oscillator is used in this capacity. These features make the unit ideally suited to battery operation.

Figure 3:
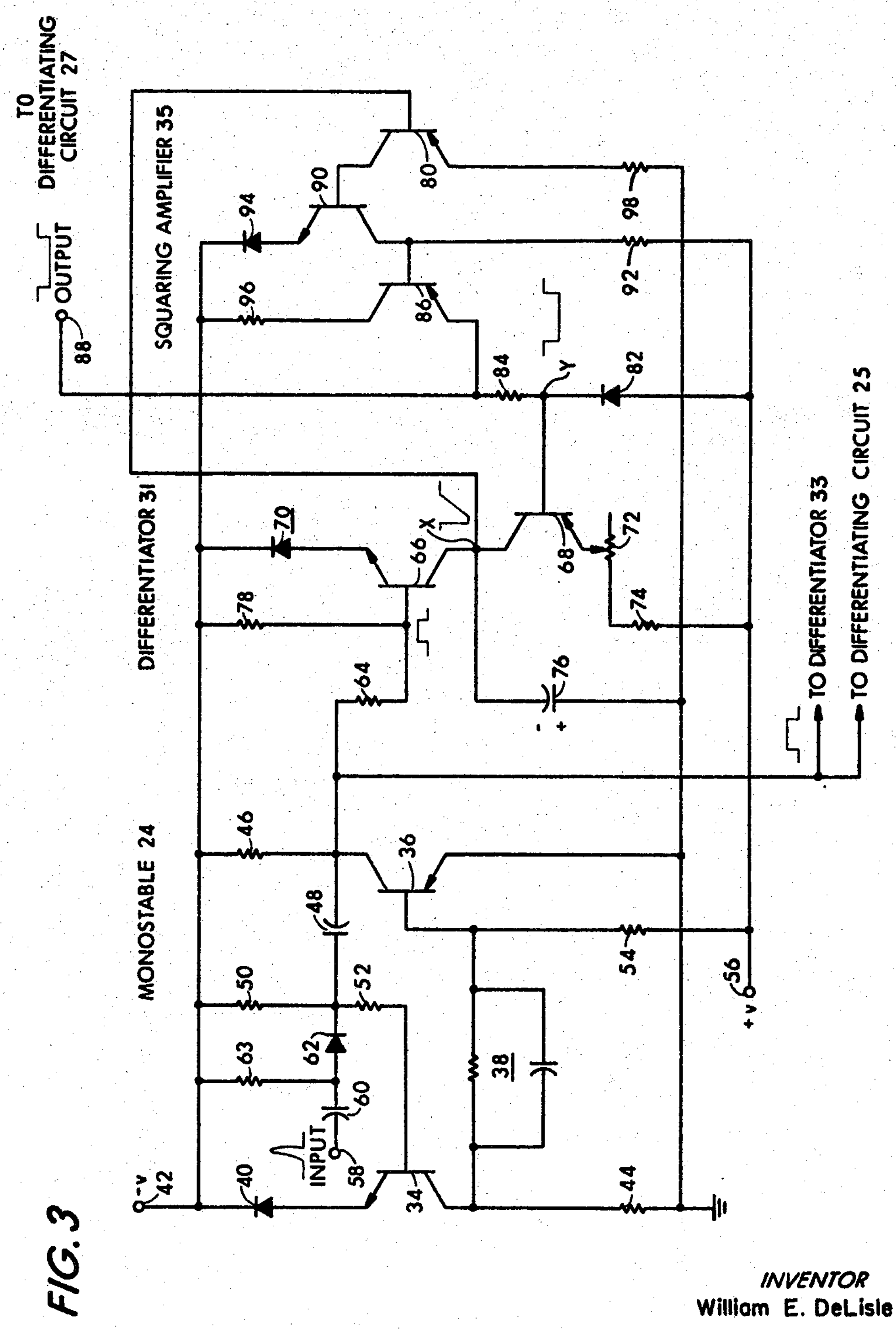
FIG. 3 is a circuit diagram of a portion of the block diagram of the decoder shown in FIG. 2; and, FIGS. *4a–4i* are timing diagrams of signals appearing at various points in the decoder of FIG. 2.

FIG. 3 illustrates a representative circuit diagram of monostable 24, differentiator 31, and squaring amplifier 35.

The monostable 24 iscludes a pair of complementary transistors 34 and 36, the collector of the former being connected to the base of the latter through an RC coupling circuit 38. The emitter of transistor 34 is connected through a diode 40 to a source of negative potential, represented by terminal 42, and the collector is connected to ground through resistor 44. The emitter of transistor 36 is connected directly to ground, and the collector is connected through resistor 46 to potential source 42, and through a timing capacitor 48 to the junction of resistors 50 and 52 which are connected between potential source 42 and the base of transistor 34. The base electrode of transistor 36 is connected through resistor 54 to a source of positive potential, represented by terminal 56. An input terminal 58 is connected through capacitor 60 and diode 62 to the junction of resistors 50 and 52, and resistor 63 is connected from the junction of capacitor 60 and diode 62 to potential source 42.

Both of transistors 34 and 36 are normally cut off in the absence of input pulses, but a positive going input pulse applied to input terminal 58 from demodulator 18 (FIG. 2) is coupled via capacitor 60 and diode 62 to charge timing capacitor 48. The resulting increase in the potential at the junction of resistors 50 and 52 is transferred to the base of transistor 34, turning it on. Conduction of transistor 34 causes the voltage at its collector electrode to drop to a negative value, this voltage change being transferred through RC coupling circuit 38 to the base of transistor 36 to turn it on. A less negative voltage output, of a given DC level, appears at the collector of transistor 36 until the RC circuit comprising capacitor 48 and resistors 50 and 52 discharges sufficiently to turn transistor 34 off, which, in turn, cuts off transistor 36. The output pulse appearing at the collector of transistor 36, of a duration determined by the aforementioned RC timing circuit, is applied in parallel through a current limiting resistor 64 to differentiator 31, through a similar current limiting resistor to differentiator 33 (not shown in FIG. 3), and to a differentiating circuit 25 (shown in FIG. 2). The differentiated leading edge of the pulses from the monostable is applied through OR gate 28 to drive shift register 26, and the differentiated trailing edge of each pulse is applied to the shift register 26 to load a ONE.

Referring again to FIG. 3, differentiator 31 includes a pair of complementary transistors 66 and 68 having their collector electrodes connected together and their emitters respectively connected through a diode 70 to potential source 42 and through a potentiometer 72 and a resistor 74 to potential source 56. The junction of the collectors is connected through capacitor 76 to ground, and also to the base electrode of transistor 80 in squaring amplifier 35; transistor 80 is of a complementary type with respect to transistor 66. The base of transistor 66 is connected through resistor 78 to potential source 42. The base of transistor 68 is connected to the junction of a diode 82, whose anode is connected to potential source 56, and a resistor 84. The other terminal of resistor 84 is connected to the emitter of transistor 86 and to the output terminal 88 of the circuit; transistor 86 is of a complementary type with respect to transistor 66.

The squaring amplifier 35 further includes a third transistor 90, the base of which is connected to the collector of transistor 80, and the collector of which is connected to the base of transistor 86, and through resistor 92 to potential source 56; transistor 90 is of a complementary type with respect to transistor 80. Its emitter is connected via diode 94 to negative potential source 42. The collector of transistor 86 is connected through resistor 96 to potential source 42, and the emitter of transistor 80 is connected through resistor 98 to ground.

Differentiator 33 and its associated squaring amplifier 37 (FIG. 2) are the same in all respects to the circuit just described with the exception that the value of resistor 74 and the setting of potentiometer 72, since they determine the slope of the discharge characteristic of the RC circuit including capacitor 76 (which are different for the two differentiators for reasons to be described), may be different.

Each of the differentiator-squaring amplifier combinations is connected in a specialized regenerative manner so as to cause all of the transistors to be cut off during standby. The combination resembles in many respects a linear sweep generator of the Miller integrator type, but is applied in the present application as a differentiator to control the linearity of the discharge characteristic of an RC circuit. The operation of the differentiator 31 and its associated squaring amplifier 35 is as follows: In the absence of input pulses, all of the transistors are cut off. Upon application of a positive input pulse from the collector of transistor 36 in the monostable circuit 24, transistor 66 is turned on causing the voltage at the collectors of transistors 66 and 68 (point X) to drop to —V. This sudden change in the potential at point X charges capacitor 76 negatively, as indicated, and, since the change is also applied to the base of transistor 80, turns transistor 80 on. Conduction of transistor 80 turns on transistor 90 which, in turn, causes transistor 86 to start conducting. Conduction of transistor 86 causes the voltage level at point Y (i.e., at the base of transistor 68) to drop to a negative value established by the clamping effect of diode 82. This negative-going change in the potential at point Y turns on transistor 68, conduction of this transistor providing a discharge path for capacitor 76 through potentiometer 72 and resistor 74 to voltage source 56. The rate of discharge of the capacitor, and hence the slope of the discharge waveform, is adjustable by the setting of potentiometer 72. When the capacitor has discharged to a threshold level determined by the emitter bias of transistor 80, the latter is turned off, causing transistors 90 and 86 to also be cut off, thereby returning the potential at point Y to its original level so as to turn transistor 68 off and terminate the discharge of capacitor 76. The pulse from the monostable 24 applied to the base of transistor 66 must be of sufficient duration that capacitor 76 is charged to the appropriate level.

Capacitor 76 does not start discharging until transistor 66 is cut off by the termination of the input pulse. Although transistor 68 starts to conduct while transistor 66 is still conducting, conduction of transistor 68 does not materially alter the current in the charge path which includes transistor 66. The flat portion of the waveform appearing at point X, namely, the period of constant amplitude following the rapid drop in potential, indicates that the capacitor 76 is charged to saturation during the period of the input pulse, this level being established by the voltage drops across the collector-emitter of transistor 66 and diode 70.

Thus, it is seen that following discharge of the capacitor 76 to a predetermined threshold level all of the transistors in the differentiator and squaring amplifier are again turned off. Diodes 40, 70, 82 and 94 are all forward biased and insure that base-emitter leakage of the transistors with which they are associated does not change the cut-off level of the transistors. It will be appreciated that if transistor 80 has suitable beta characteristics, its emitter could be connected to point Y and transistor stages 86 and 90 eliminated. It will be evident that the output at terminal 88 is a rectangular pulse of a duration determined by the slope of the discharge characteristic of capactor 76 and the predetermined threshold at which transistor 80 becomes non-conducting. The leading edge of the output pulse is in time coincidence with the leading edge of the pulse applied to the base of transistor 66, and the trailing edge is delayed therefrom in proportion to the delay introduced by the differentiator 31. As has been noted, the value of resistor 74 and the setting of potentiometer 72 in differentiator 33 differ from the corresponding elements in differentiator 31 so as to cause a different rate of discharge of capacitor 76 with the consequence that the rectangular pulse output of differentiator 33 differs from the pulse output of differentiator 31, their leading edges, however, being coincident. The significance of the difference in the width of the pulses from the two differentiators will become apparent hereinafter. The output pulse from squaring amplifier 35 is applied to differentiating circuit 27 and the differentiated trailing edge of the pulse applied as a second input to OR gate 28. The pulse from squaring amplifier 37 is also differentiated (by differentiating circuit 29) and the differentiated trailing edge thereof applied as a trigger pulse for sample and clear monostable 30.

Sample and clear monostable 30 may comprise a circuit similar to that described with respect to monostable 24.

*Decoder operation*

Figure 2:
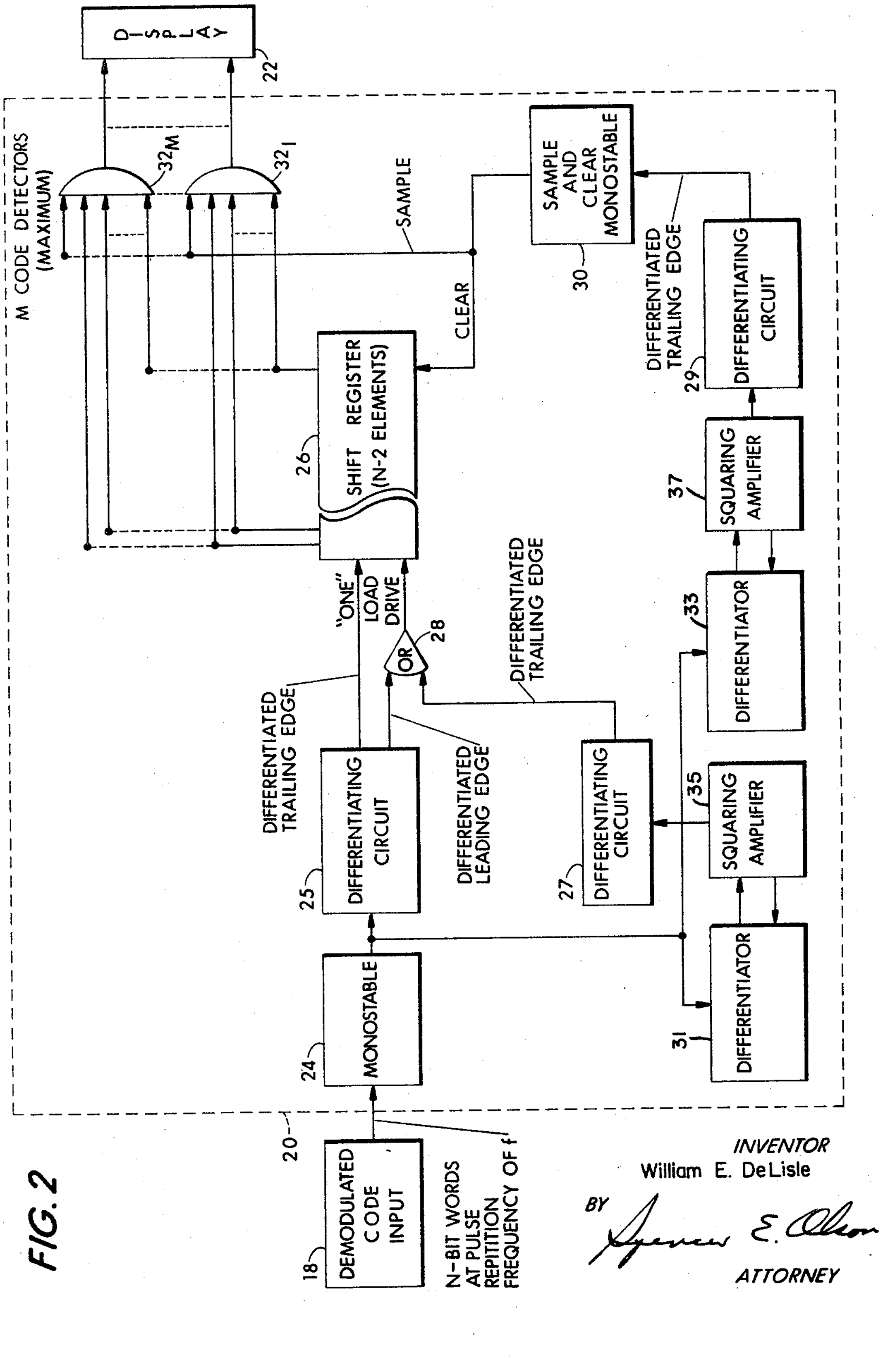
FIG. 2 is a detailed block diagram of the self-timing decoder portion of the receiver of FIG. 1.
Figures 4A, 4B, 4C, 4D, 4E, 4F, 4G, 4H, 4I:
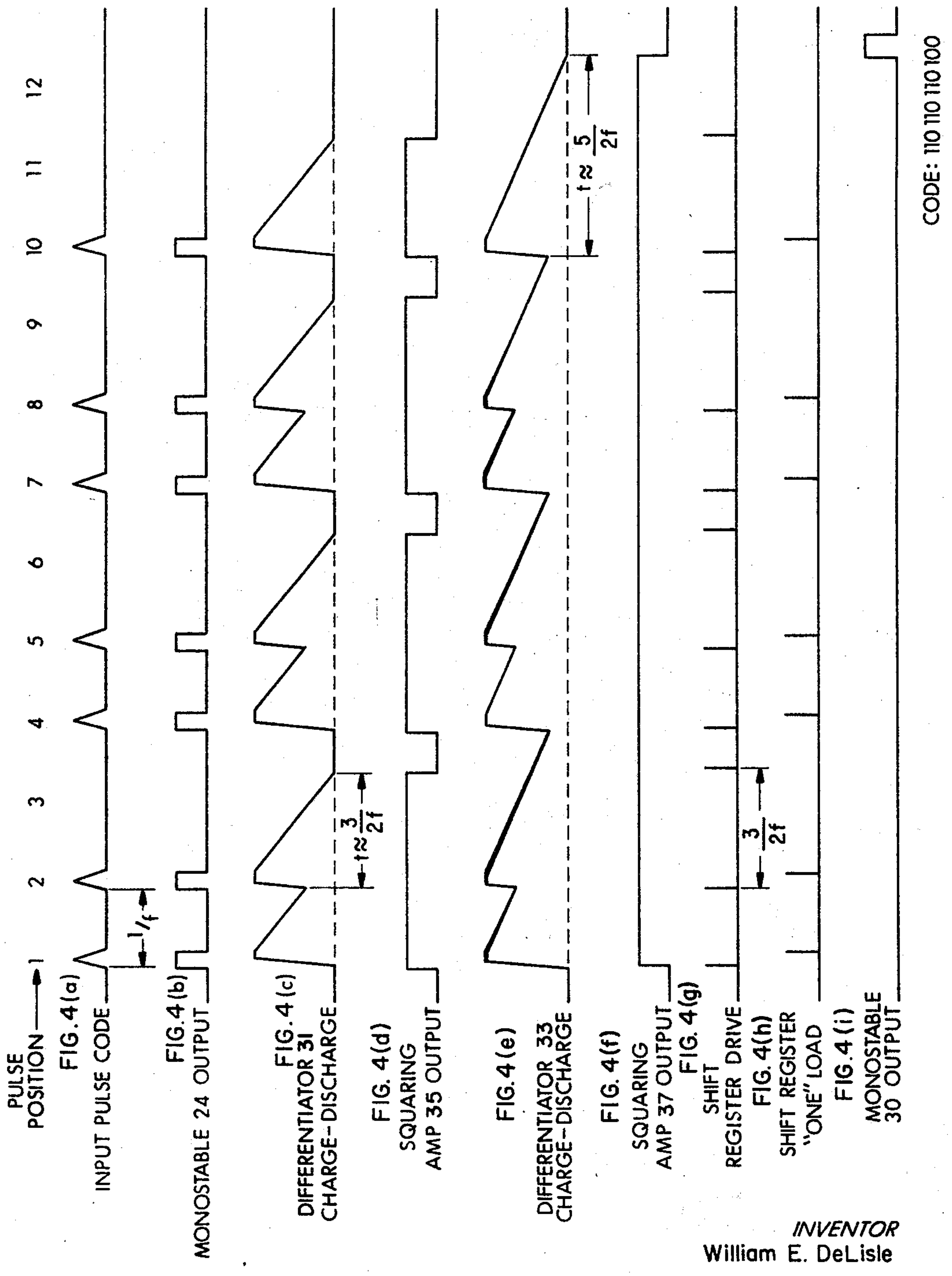

Having described those circuit components of the block diagram of FIG. 2 that are not well known in the art, the operation of the decoder will now be explained with reference to the timing diagram of FIG. 4 which illustrates the waveforms occurring at various points in the circuit upon receipt of the binary code 110110110100. The input pulse code from demodulator 18, shown in line (*a*) is a series of narrow pulses having a pulse repetition frequency of *f*, and in which a ONE is indicated by a pulse and a ZERO is indicated by the absence of a pulse at a position spaced from a pulse by the pulse repetition period. These pulses are applied to the monostable circuit 24 which is operative to produce a similar train of output pulses of uniform width and amplitude, their width relative to the width of the input pulses being somewhat exaggerated in line (*b*) of FIG. 4. The output pulses from the monostable 24 perform three functions: (1) After differentiation by differentiator 25, the differentiated leading edge, shown in line (*g*) of FIG. 4, is applied through OR gate 28 to the drive input of shift register 26; (2) the differentiated trailing edge, shown in line (*h*) is applied to the first element or stage of shift register 26 and is operative to load a ONE into the shift register; and (3) the full pulse width is applied to charge the capacitor 76 in differentiators 31 and 33 to a fixed voltage as indicated in lines (*c*) and (*e*) of FIG. 4. For simplicity in showing the timing relationships of the various pulse trains, all of the waveforms of FIG. 4 are shown as having positive polarity, contrary to the actual polarity of certain of the pulses appearing in the circuit, as will be apparent from an examination of FIG. 3. Important to the capability of the circuit to decode the input pulse train is the rate of discharge of capacitor 76 and the difference in the rate of discharge of this capacitor between differentiator 31 and differentiator 33. As shown in line (*c*) of FIG. 4, the values of resistor 74 and the setting of potentiometer 72 in differentiator 31 are so chosen that capacitor 76 discharges linearly from its fully charged condition to a predetermined threshold level, represented by the dotted line, in a time corresponding approximately to 1½ times the repetition period of the input pulses. Consequently, when two pulses representing ONES occur in successive pulse periods the capacitor is unable to discharge to the threshold level. The discharge circuit in differentiator 33, on the other hand, has component values which allow capacitor 76 to discharge from its fully charged condition to the threshold level indicated by the dotted line in line (*e*) of FIG. 4 in a time approximately equal to 2½ times the repetition period of the input pulses. Consequently, the capacitor will not discharge to the threshold level except in the condition when a ONE pulse is followed by two or more ZEROS. In this manner, as will be further clarified hereinafter, each differentiator-squaring amplifier combination functions as a self-timing circuit for controlling the operation of the decoder in lieu of a clock source.

Assuming now that all of the shift register elements are cleared and that all of the transistors in the circuit of FIG. 3 are cut off, the decoder operates as follows to recognize and generate a unique output for a single copy of the pulse code represented by line (*a*) of FIG. 4. The first pulse, representing a ONE, triggers monostable 24 which, in turn, generates a rectangular pulse which is applied in parallel to the base of transistor 66 in both of differentiators 31 and 33. As previously described, capacitor 76 becomes charged to a predetermined level and at the termination of the pulse from the monostable 24 starts to discharge at a predetermined linear rate. Because of the selected time of discharge the capacitor does not discharge to the predetermined threshold level prior to receipt of the next ONE pulse. In other words, if the second bit in the word is a ONE, the capacitor 76 is recharged to the aforesaid predetermined level before it has had an opportunity to discharge to the threshold level. The differentiated leading edge of the monostable output pulse is conducted through OR gate 28 to drive the shift register 26 by one increment, and the differentiated trailing edge of the pulse loads a ONE in the first element of the shift register.

The second pulse of the code word, representing a ONE, causes another set of drive and load pulses to be applied to the register; as a result, the ONE in the first element of the shift register is shifted to the second element, and another ONE is loaded in the first register element.

Upon receipt of a ZERO in the third pulse position in the code word (i.e., the absence of a pulse) the monostable 24 does not produce an output pulse, and the capacitor 76 in differentiator 31 has time to discharge to the threshold level. This causes a change in state of the squaring amplifier 35 and termination of the rectangular pulse output at terminal 88 as indicated in line (*d*). After differentiation by differentiator 27, the differentiated trailing edge of this relatively long rectangular pulse is applied through OR gate 28 to the drive input of shift register 26, this shifts ONES into the second and third elements of the register, but since there is not a corresponding pulse applied to the "ONE" load input of the shift register, a ZERO is effectively loaded into the first element of the register. The discharge characteristic of differentiator 33 prevents the discharge of its capacitor 76 to its threshold level within the period between the second and fourth input pulses whereby squaring amplifier 37 remains in the state to which it was set by the first input pulse as indicated in line (*f*).

The just described process is repeated to produce the waveforms shown until receipt of two consecutive ZEROS at pulse positions 11 and 12, the last two bits of the code word, following a ONE pulse at position 10. In this situation, the capacitor 76 in differentiator 31 discharges to the threshold level at a time shortly after the occurrence of the ZERO at position 11 so as to change the state of squaring amplifier 35 to feed a drive pulse to the shift register, and the capacitor in differentiator 33 now also has time to discharge to the threshold level causing its associated squaring amplifier 37 to change its state and produce a sudden change in potential at its output terminal as indicated in line (*f*). After differentiation by differentiator 29, the differentiated trailing edge of the long pulse produced by squaring amplifier 37 triggers the sample and clear monostable 30 which produces the rectangular output pulse shown in line (*i*) of FIG. 4. This output pulse is applied in parallel to each of the code detectors 32, of which there are a number equal to the number of unique code words possible in an N-bit word having the aforementioned restraints, to enable or ready the detectors to produce an output pulse provided the other input terminals thereof are suitably energized. The pulse is simultaneously applied to magnetic shift register 26 in a manner to reset all of the elements thereof to the ZERO state. As the shift register 26 is "cleared," the outputs from the individual magnetic core elements thereof (a pulse from each element which had contained a ONE and a selected voltage level from each element which had contained a ZERO) activate the single detector connected to recognize the particular binary code represented by those outputs, causing the detector to deliver an output signal for application to display means 22. The display is arranged to visually present the received code word. Following the described sequence of operations, the decoder is in the rest position, with all of the transistors in the differentiators and squaring amplifiers turned off, and remains so until the next ONE is received. It will be noted that although a twelve bit code word is used, a ten element shift register is sufficient for storage. Pulse position 12 is used only for reset and readout control, and pulse position 1 being common to all the code words, is shifted out of the register when the next to last ZERO (pulse position 11) is loaded into the shift register.

Figure 5:
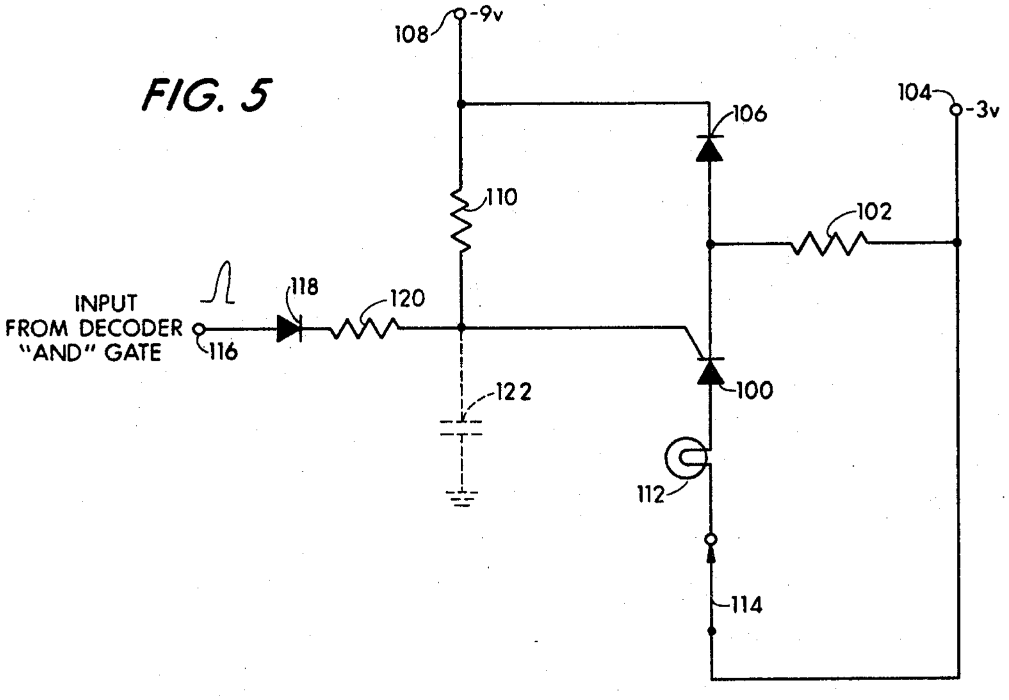
FIG. 5 is a circuit diagram of a portion of the display means useful in the code communication system of FIG. 1.

A preferred embodiment of display means 22 comprises an SCR indicator lamp circuit connected to the output terminal of each code detector; i.e., if there are M code detectors, M indicator lamp circuits are employed. Referring to FIG. 5, the lamp circuit comprises a silicon controlled switch 100 having its cathode connected through resistor 102 to a source of negative bias potential represented by terminal 104. A diode 106 is connected between the cathode of switch 100 and a second source of negative potential, represented by terminal 108; resistor 110 is connected between the gate of switch 100 and potential source 108; and, lamp 112 and a manual reset switch 114 are serially connected from the anode of switch 100 to potential source 104. Input terminal 116 represents the output terminal of a code detector 32 and is coupled through diode 118 and resistor 120 to the gate of silicon controlled switch 100. Normally, diode 118 and switch 100 are not conducting and indicator lamp 112 is off. Activation of the code detector causes a positive going pulse to be applied to terminal 116 from the AND gate; this pulse is coupled through diode 118 and resistor 120 to the gate of switch 100 to cause the silicon controlled switch to conduct, thereby turning on indicator lamp 112. Since the silicon controlled switch will continue to conduct until its anode voltage is interrupted, lamp 112 will remain lit until reset switch 114 is opened. A suitable capacitor 122 may be connected from the gate of switch 100 to ground if it is desired to integrate a number of successive decodings before lighting the indicator lamp.

It will be evident from the foregoing description of the operation of the system that the bit rate of the transmitted code is not critical; a variation of ±10% is easily tolerated. The reason is that bit time errors, due to a frequency difference (error) between the pulse rate actually transmitted and that for which the receiver timing is established, are not cumulative since the loading of each ONE into the shift register is controlled by a drive pulse generated by each of the input information pulses. It is possible for some accumulation of error on ZEROS by reason of the fact that ZERO loading is determined by the internally generated differentiated trailing edge of the output of squaring amplifier A′, but since the accumulation is allowed to occur over only two, or at most, three bits due to the restraints initially placed on the code, with consecutive ZEROS to occur only at the end of the word, such accumulation of time errors as may occur is not serious. Because the decoder extracts timing information from the received signal, on a pulse-by-pulse basis, there is no delay in the decoding response, and a single transmission of the code word is sufficient to operate the decoder.

Although the decoder has been described as providing an output indication upon recepit of a single copy of the code word, the code detectors 32 may incorporate integrators such that a number of successive receptions of a given code word are required before an output signal is produced. Also, in some cases it may be desirable to place additional restraints on the transmitted code, for example, that each word contain the same number of ONES, in which event the decoder may be simplified to recognize only the ONES. The latter modification of the code word, however, is susceptible to multiple decoding in a noisy environment.

While there has been disclosed what is at present considered to be a preferred embodiment of the invention, it is apparent that various modifications and changes may be made therein without departing from the intended scope of the invention as defined in the appended claims.

What is claimed is:

1. A binary code communication system comprising, in combination, means for generating a code word consisting of a series of bits each having a first or a second state, the first bit and the third from the last bit of said series having said first state, the last two bits of said series having said second state, and the remaining bits of said series being arranged so that consecutive bits having said second state shall not occur, means for receiving said code word, storage means, input means solely responsive to said received code word and operative to load into said storage means bits having said first state, first self-timing means controlled by said input means and operative to load into said storage means bits having said second state, second self-timing means controlled by said input means and operative in response to consecutive bits having said second state to unload the code word from said storage means, and code detection means responsive to the output of said storage means for providing a unique output for the received word.

2. In a pulse code communication system, a source of binary code words each consisting of a predetermined series of substantially uniformly spaced pulses and omissions in combination with a self-timing decoder of said words comprising, a shift register having a plurality of output terminals equal in number to the number of pulses and omissions in said series minus two, a first monostable circuit arranged to be triggered by the pulses from said source and operative to drive said register and to load pulses into said register, a first regenerative differentiator-squaring amplifier circuit operative in response to the output of said first monostable to drive said shift register upon occurrence in said series of an omission following a pulse, a second monostable circuit, a second regenerative differentiator-squaring amplifier circuit connected to first monostable and operative upon occurrence in said series of consecutive omissions following a pulse to trigger said second monostable, a plurality of AND gates connected to each of the output terminals of said shift register, and means for coupling the output of said second monostable to said shift register to clear the latter and to each of said AND gates, whereby an AND gate corresponding to the code word received is activated to generate an output signal.

3. A pulse code communication system in accordance with claim 2 wherein said first and second monostable circuits each comprise first and second complementary transistors, means including a timing capacitor connected between said first and second transistors for controlling the time of operation of the respective monostable circuit, and means for coupling the pulses from said source to said timing capacitor, whereby both of said transistors conduct in response to application of a pulse to charge said timing capacitor and both of said transistors are rendered substantially nonconducting in response to sufficient discharge of said timing capacitor.

4. In a pulse code communication system, the combination set forth in claim 2 wherein said first and second regenerative differentiator-squaring amplifier circuits each comprise first and second complementary transistors each having emitter, collector and base electrodes, the collector electrodes of said first and second transistors being connected together, a first source of potential, means connecting the emitter of said first transistor to said first potential source, a second source of potential, means including a resistor serially connected between the emitter of said second transistor and said second potential source, a source of reference potential, a timing capacitor connected from the junction of the collectors of said first and second transistors to said reference potential source, means coupling the output of said first monostable to the base of said first transistor, an amplifier including a third transistor connected between the junction of the collectors of said first and second transistors and the base electrode of said second transistor, said third transistor being of complementary construction with respect to said first transistor, and a diode connected between said second potential source and the base of said second transistor, whereby said first, second and third transistors are caused to conduct and said timing capacitor is charged in response to a pulse applied to the base of said first transistor, said first transistor is rendered substantially nonconducting upon termination of the pulse applied to its base, and said second and third transistors are rendered substantially nonconducting in response to sufficient discharge of said timing capacitor.

5. A pulse code communication system comprising, in combination, means for generating any one of a plurality of binary code words each consisting of a predetermined series of pulse and omission bits having a pulse repetition frequency of $f$, the first bit and third from last bit of said series being pulses, the last two bits of said series being omissions, and the remaining bits of said series being arranged so that consecutive omissions shall not occur, said series having a predetermined length of N bits, means for receiving said code word, a shift register having a length of N—2 elements, a first monostable circuit arranged to be triggered by the pulses of said received code word and operative to drive said register and load pulses into said register, a first time control circuit operative in response to the output of said first monostable to drive said register upon occurrence of an omission following a pulse in said series, said first time control circuit including an RC network having a maximum discharge period of approximately $3/2f$, a second monostable circuit, a second time control circuit operative in response to the output of said first monostable to trigger said second monostable upon occurrence of consecutive omissions following a pulse in said series, said second time control circuit including an RC network having a maximum discharge period of approximately $5/2f$, a plurality of AND gates each having input terminals connected to the output terminals of said shift register, and means for coupling the output of said second monostable to said shift register to clear the latter and to each of said AND gates, whereby an AND gate corresponding to the code word received is activated to generate an output signal.

References Cited

UNITED STATES PATENTS

| | | | |
|---|---|---|---|
| 3,114,047 | 12/1963 | Kihn et al. | 328—37 X |
| 2,498,695 | 2/1950 | McWhirter et al. | 340—164 X |
| 3,175,191 | 3/1965 | Cohn et al. | 340—164 |

OTHER REFERENCES

Morphet: Self-Syncing Clock for Binary Data, IBM technical disclosure bulletin vol. 2, No. 4, December 1959, pp. 64–65.

ROBERT L. GRIFFIN, *Primary Examiner.*

W. S. FROMMER, *Assistant Examiner.*